Aug. 25, 1925.

C. KNOTT 1,550,704

INTERNAL COMBUSTION ENGINE

Original Filed Oct. 9, 1922

WITNESSES
George C. Myers
J. P. Schrott

INVENTOR
Charles Knott
BY
ATTORNEYS

Patented Aug. 25, 1925.

1,550,704

UNITED STATES PATENT OFFICE.

CHARLES KNOTT, OF NEW MADRID, MISSOURI.

INTERNAL-COMBUSTION ENGINE.

Application filed October 9, 1922, Serial No. 593,303. Renewed June 30, 1925.

*To all whom it may concern:*

Be it known that I, CHARLES KNOTT, a citizen of the United States, and resident of New Madrid, in the county of New Madrid and State of Missouri, have invented certain new and useful Improvements in Internal-Combustion Engines, of which the following is a specification.

My invention relates to improvements in internal combustion engines and its consists of the constructions, combinations and mode of operation herein described and claimed.

An object of the invention is to provide an internal combustion engine of the two-cycle type in which all of the functions of such an engine are performed without the use of valves.

A further object of the invention is to provide means in a two-cycle internal combustion engine which is adapted to receive and cause the recoil of the exhaust gas in such a manner as to prevent the escape of even a portion of the new charge at the exhaust port before the latter is closed on the return stroke of the piston.

A further object of the invention is to provide a recoil chamber in combination with the exhaust port of a two-cycle engine so as to prevent the exhausting of the new charge after the intake port has closed.

Other objects and advantages will appear in the following specification, reference being had to the accompanying drawing, in which Figure 1 is a section of a conventional type of two-cycle internal combustion engine illustrating the application of the recoil chamber to the exhaust port.

Figure 1:
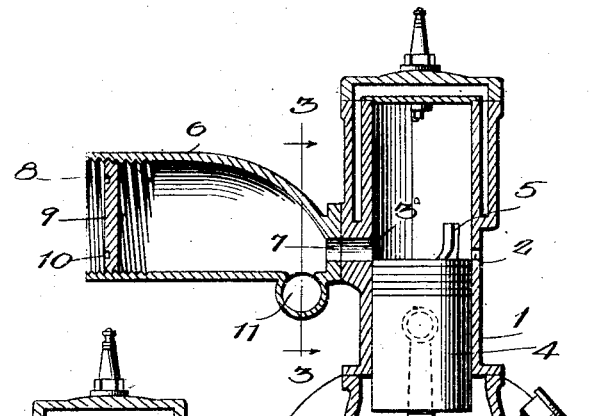

In order to illustrate the application of the invention the drawing in Figure 1 shows an internal combustion engine 1 of a conventional type, which has the intake port 2 and exhaust port 3. The piston 4 has a baffle 5 adjacent to the intake port so that the incoming charge is diverted upwardly and assists in driving out a previously burnt charge. This baffle characterizes the engine as of the two-cycle type.

It is common knowledge that the exhaust port 3 is larger than the intake port 2 and in a two-cycle engine the piston 4 uncovers the exhaust port before the intake port is uncovered to thereby relieve the internal pressure before said intake port opens. As a natural result the exhaust port is closed after the intake port has been closed and the momentum of the exhaust gases tends to carry out a portion of the fresh gas and thereby impair the efficiency of the engine.

The purpose of the invention is to prevent this loss of a portion of the fresh gas. Mounted over the exhaust port 3 is a chamber 6. This has an opening 7 which corresponds with the exhaust port 3. The extremity of the chamber is internally threaded at 8 and a head 9 is screwed in place by means of a spanner wrench which is adapted to fit the holes 10. By screwing the head 9 in and out in respect to the chamber 6 adjustments as to capacity of the chamber are made.

Situated on the underside of the chamber 6 and adjacent to the opening 7 is a duct 11 which carries off the exhaust gas after its function has been performed in the chamber. Assume the piston 4 to be propelled downwardly and outwardly by the expanding gas of a previously burnt charge. As soon as the upper surface of the piston uncovers the exhaust port 3 the gas will naturally rush directly into the chamber 6, strike the head 9, recoil and again pass toward the opening 7 and the port 3. The recoil chamber 6 is so designed that the recoiled gas will reach the opening 7 and port 3 at such a time that it will offer an abutment for the fresh charge of gas which by that time will have entered the cylinder 1 and prevent such fresh charge from escaping at the port 3.

The action within the cylinder 1 can readily be followed. The reader will understand that the piston 4 uncovers the intake port 2 immediately after the exhaust port 3 has been uncovered. Fresh gas will enter the cylinder while exhaust gas is streaming into the recoil chamber 6. Were it not for the fact that the gas recoils in the chamber 6 and offers an abutment at the opening 7 the fresh gas would also follow and thus be lost. By properly designing the shape of the recoil chamber 6 the exhaust gas can be saved to recoil at precisely such time as to prevent the escape of even a portion of the fresh gas.

The piston 4 soon again closes the exhaust port 3 on the inward stroke and it is then that the exhaust gas escapes at the duct 11.

A modification of the recoil chamber consists of a chamber 6ª (Fig. 2) very much on the order of the expansion chamber of a pump. This chamber, like the recoil chamber 6 of the form in Figure 1, has a suitably arranged flange 12ª by means of which it is fastened in place on the cylinder 1ª over the exhaust port 3ª so that the opening 7ª registers therewith. In Figure 1 the chamber 6 has a flange 12 by means of which it is secured in position.

Figure 2:
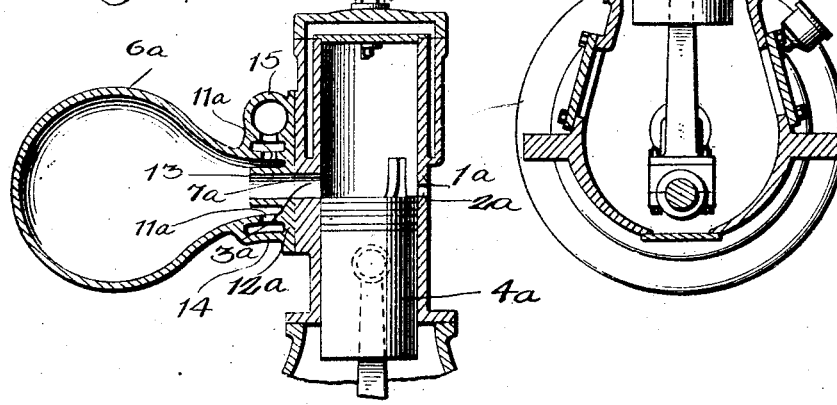
Figure 2 is a detail section of an engine illustrating a modification of the recoil chamber.
Figure 3:
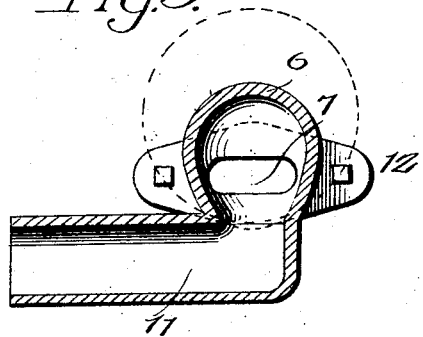
Figure 3 is a cross section on the line 3—3 of Figure 1 and is an end elevation of the chamber in Fig. 1.
Figure 4:
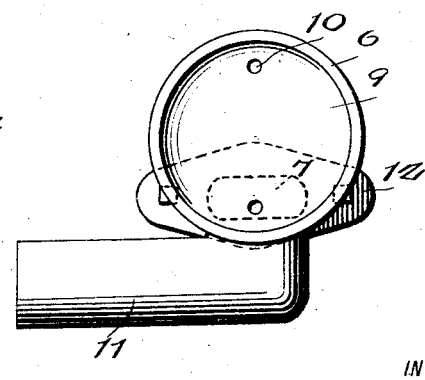
Figure 4 is an end elevation of the recoil chamber in Fig. 1.

Arranged within the recoil chamber 6ª (Fig. 2) and in continuation of the opening 7ª is a short exhaust tube 13, the function of which is to insure the passage of the exhaust gas into the main body of the recoil chamber and so obviate the likelihood of a direct escape at a plurality of radial openings 11ª. These openings discharge into an annular chamber 14 which, in turn, communicates with a duct 15. The operation of the modification in Figure 2 is precisely like that of the arrangement in Figure 1. Upon uncovering of the exhaust port 3ª the gas, by virtue of its high initial velocity will discharge directly into the chamber 6ª against the innermost wall.

The piston 4ª proceeds downwardly and outwardly until the intake port 2ª is uncovered, whereupon fresh gas enters and takes the general direction of the exhaust port 3ª. However, before the fresh gas can escape at the exhaust port the exhaust gas will have recoiled and reached the opening 7ª where it forms an abutment or a back pressure to prevent the fresh gas from escaping at the port 3ª. The exhaust gas escapes at the radial openings 11ª into the annular exhaust chamber 14, and the piston 4ª proceeds to compress the new charge, as before. It is obvious that either form of the invention will function as a muffler as well as a recoil chamber for the purpose described.

While the construction and arrangement of the invention herein disclosed is that of a generally preferred form, obviously modifications and changes may be made without departing from the spirit of the invention or the scope of the claims.

I claim:—

1. In combination with an internal combustion engine having an exhaust and an intake port, a recoil chamber fitted in position over the exhaust port to receive the exhaust gas upon uncovering of the exhaust port by the piston and insuring the recoil of said gas to offer an abutment at the exhaust port and prevent the escape of fresh gas subsequently admitted at the intake port, means forming one wall of the recoil chamber which means is adjustable to vary the capacity of said chamber and thereby regulate the recoil of the exhaust gas, and means by which the exhaust gas escapes after having acted as said abutment.

2. In combination with a two-cycle internal combustion engine having an exhaust and an intake port, a recoil chamber arranged to be affixed to the engine and having an opening coinciding with the exhaust port to receive the exhaust gas upon uncovering of the exhaust port by the piston and insuring its recoil to form an abutment at said opening and to prevent the escape of fresh gas admitted at the intake port, a movable portion forming a part of said chamber, means upon which said portion is movable so as to vary the capacity of the chamber and consequently the time of recoil of the gas, and means by which the exhaust gas escapes after having acted as said abutment.

3. In combination with a two-cycle internal combustion engine having an exhaust and an intake port, a recoil chamber arranged to be affixed to the engine and having an opening coinciding with the exhaust port to receive the exhaust gas upon uncovering of the exhaust port by the piston and insuring its recoil to form an abutment at said opening and to prevent the escape of fresh gas admitted at the intake port, a movable portion forming a part of said chamber, means upon which said portion is movable so as to vary the capacity of the chamber and consequently the time of recoil of the gas, and means associated with said chamber enabling the escape of the exhaust gas after its function as an abutment has been performed.

4. An internal combustion engine cylinder having exhaust and intake ports in opposition, means associated with the exhaust port to receive the exhaust gas when said port is uncovered by the piston and in which the exhaust gas recoils to produce an abutment at said exhaust port to prevent the escape of the fresh charge admitted to the cylinder by the subsequently uncovered intake port, and means near said exhaust port at which the exhaust gas escapes after having acted as said abutment.

5. An internal combustion engine cylinder having an intake port and an exhaust port, means fitted in place over the exhaust port to provide a chamber into which exhaust gas is discharged upon the uncovering of the exhaust port by the piston, the chamber having an opening close to the exhaust port outside of the cylinder, said gas recoiling in the chamber toward said opening and thereby producing an abutment at the exhaust port to prevent the escape of fresh air subsequently admitted into the cylinder by the uncovering of the intake port.

6. In combination with an internal combustion engine having a cylinder with substantially aligning exhaust and intake ports, a vessel having an entrance fitted over the exhaust port being entirely closed with the exception of an opening to atmosphere beside said entrance, there being a recoil of exhaust gas in said vessel upon uncovering of the exhaust port by the engine piston producing an obstruction to the straight passage through of fresh gas admitted at the intake port.

7. The method of preventing the wasting of combustible gas in an internal combustion engine consisting of employing exhaust gas as an abutment at an opening through which said combustible gas tends to escape.

CHARLES KNOTT.